Feb. 1, 1966   J. V. FOLL   3,233,037
FACSIMILE TELEGRAPH APPARATUS
Filed Aug. 6, 1962
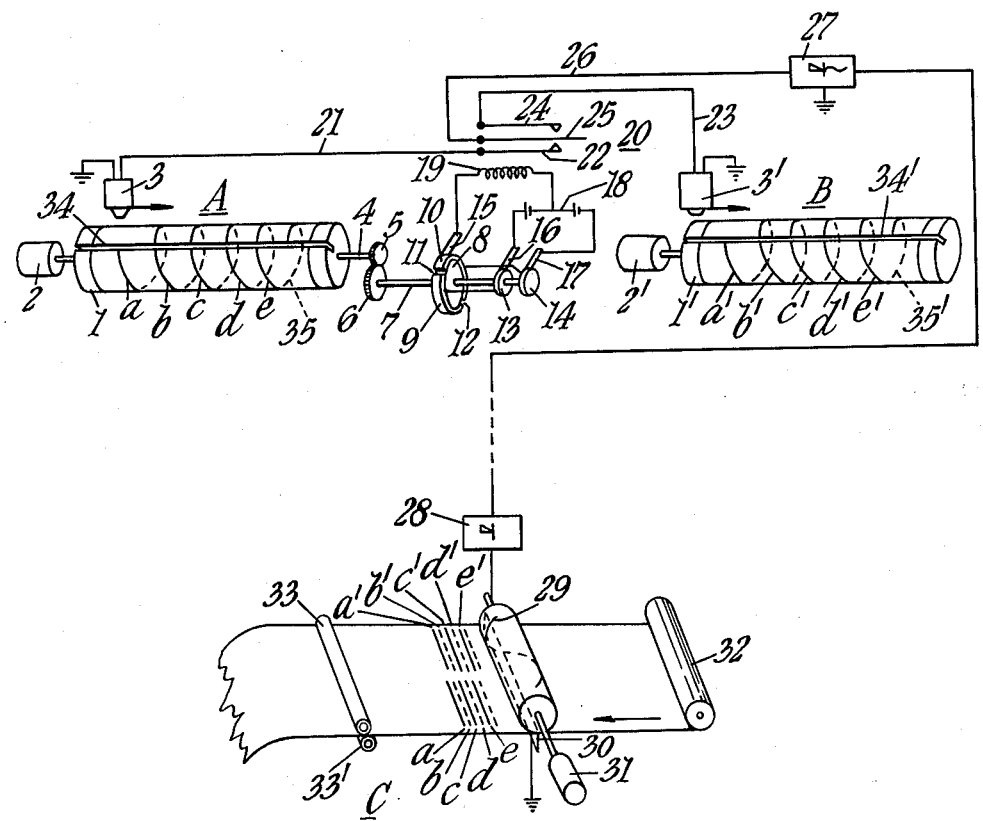

United States Patent Office 3,233,037
Patented Feb. 1, 1966

3,233,037
FACSIMILE TELEGRAPH APPARATUS
John Victor Foll, Beckenham, Kent, England, assignor to Muirhead & Co. Limited, Kent, England
Filed Aug. 6, 1962, Ser. No. 214,963
Claims priority, application Great Britain, July 4, 1962, 25,675/62
5 Claims. (Cl. 178—5)

This invention relates to facsimile transmission systems in which the material to be transmitted is progressively scanned. In one system this is achieved by mounting of the material on a drum which is rotated in front of a lamp and lens arrangement to project a small beam of light on to the surface of the drum and a second lens collects the light reflected from the surface which light varies according to the optical tone or colour of the surface and directs it on to a photo-electric cell or equivalent electro-optical device. Axial movement takes place between the rotating drum and the optical system so that the whole surface of the original is progressively scanned in a close helix. The signals delivered by the electro-optical system are usually used to modulate a carrier for transmission by land line or, if desired, they may be used to modulate the carrier of a radio transmitter.

At a receiving terminal the signals are demodulated and the resultant signal is applied to a receiver employing a photo-sensitive recording medium or an electrolytic recording medium commonly consisting of a paper base impregnated with an aqueous solution which is electrically conductive and contains agents which produce a dark coloured mark on the passage of an electric current through the paper. In order to make the record it is necessary to scan the recording medium in a manner corresponding to the optical scanning process at the transmitter and this may be carried out in the case of a photo-sensitive medium by a means similar to the transmitter and in the case of an electrolytic medium by means of two electrodes one on either side and in contact with the recording medium with means for traversing the point of contact across the width of the recording medium to form a series of parallel lines corresponding to the scanning lines of the transmitter.

In a known form of electrolytic recording one electrode is a blade over which the recording medium is passed and a second electrode consists of a rotatable helix. Thus when it is arranged that the speed of rotation of the helix is identical with that of the transmitter drum and the two are in proper phase relationship, simultaneous identical scanning takes place at the transmitter and the receiver respectively and a true facsimile of the transmitted material is recorded.

Facsimile systems of the kind described are commonly used by meterological organisations for the transmission of data in the form of weather charts. A weather chart may comprise a map of the area under consideration on which are drawn lines of isobars connection points of equal atmospheric pressure and also lines depicting the "fronts" associated with local atmospheric disturbances. The latter are usually drawn in boldly and carry marks indicating the type of front, for example, cold, warm or occluded. In a comprehensive weather chart, much more information is included relating to wind speed and direction, cloud cover, and so on so that there is a mass of complex detail to be recorded.

It will be apparent that to resolve this detail an adequate scanning rate (lines per inch) must be used and for a given drum speed this determines the time taken to transmit a complete chart. Furthermore, since the resolution falls off as the drum speed is increased there must be an upper limit to this speed. In practice, drum speeds of 60, 90 and 120 rev./min. with a scanning rate of 96 lines per inch are commonly used for chart transmission.

In the field of meterological prognostication it is becoming increasingly necessary to disseminate information at frequent intervals relating only to the weather fronts which, as has been said, are drawn on the chart with bold characterization and for this purpose it is of little importance if the finer details are lost in the scanning process. Consequently it is permissible for the purpose to sacrifice definition to a desirable increase in speed of transmission.

It is an object of the present invention to provide apparatus for the transmission of meterological charts and the like sensibly simultaneously by a plurality of facsimile transmitters and record said charts sensibly simultaneously on a single facsimile receiver but at a correspondingly reduced size and resolution.

It is a further object to carry out the invention using standard facsimile apparatus with a minimum of alteration and addition thereto.

The invention consists in a facsimile system in which successive scanning lines are selected from a plurality of facsimile transmiters in turn for recording over a single scanning line at a receiver.

In a system employing two transmitters co-operating with a single receiver it is arranged that the transmitter drums rotate at exactly twice the speed of the receiver helix. At the transmitting end a change-over switch, which may be operated by a relay device, switches the output from the transmitters alternately to the transmission circuit at the completion of each line scan, thus although the material on each transmitter drum is scanned normally only alternate scanning lines are transmitted. At the receiving end the helix rotates at half the transmitter drum speed so that each scanning line at the transmitter will be represented by a recorded scanning line of half the normal length and furthermore because of the alternate switching arrangement at the transmitter only alternate lines will be recorded. Thus the final record comprises a facsimile reproduction of the copy on each transmitter drum of half the size of the original with alternate scanning lines suppressed.

An embodiment of the invention will now be described with reference to the accompanying drawings depicting in schematic form a facsimile transmission system according to the invention embodying two facsimile transmitters co-operating with a facsimile receiver. It will be understood that because of the kinds of transmitter and receiver are well known to those versed in the art only the parts relevant to the invention are shown. In the figure one facsimile transmitter is designated A and the other B, while the co-operating receiver is designated C. It will be assumed that any conventional means is employed to ensure that the two transmitters are in phase.

Transmitter A comprises a message carrier 1 in the form of a drum rotated at constant speed by electromotor 2 and electro-optical scanning head 3 is arranged to scan the message carrier 1 in the direction of the arrow. An extension of the drum shaft 4 carries a pinion 5 engaging gear wheel 6 giving a 2:1 speed reduction to shaft 7. Commutator 8 is rigidly attached to shaft 7 and carries on its peripheral surface two contact segments 9 and 10 separated by small gaps 11 and 12. Contact segments 9 and 10 are electrically connected with slip rings 13 and 14 respectively which are also rigidly attached to shaft 7. Brush 15 bears on commutator 8 and brushes 16 and 17 bear on slip rings 13 and 14 respectively. Brushes 16 and 17 are connected to the poles of a D.C. source 18, a centre tap thereof being connected to one end of the energising winding 19 of relay 20. The other end of the energising winding 19 is connected to brush 15 bearing on commutator 8. The transmitter B is generally similar to transmitter A and like parts are designated with like numerals but identified with a tick, thus 1' etc. Relay 20 is of the well known polarized kind provided with a single pole change-over spring set so that when the relay is energised with a certain polarity the centre contact makes with one side contact and when the polarity is reversed the centre contact changes over to the other side contact. The scanning head 3 of transmitter A is connected over lead 21 to side contact 22 and the scanning head 3' of transmitter B is connected over lead 23 to side contact 24. The centre contact 25 is connected over lead 26 to the input of the modulator 27 the output of which is connected to a suitable land line.

At the receiving end the signal is demodulated at 28 and the retrieved message signal is applied to the receiver C so that the signal current passes from the rotating helix 29 through the recording medium to the fixed electrode 30. The helix 29 is rotated by constant speed electromotor 31 and the recording medium is drawn from roll 32 between the marking electrodes by feed rollers 33 and 33'.

As has been stated above the speeds of the transmitter drums are identical and twice the speed of the recorder helix while the scanning pitch is common to transmitters A and B and receiver C. The spiral scanning lines 35 and 35' at transmitters A and B respectively and the corresponding linear markings at the receiver are for greater clarity of presentation shown with greatly extended scanning pitches. It will be apparent from the foregoing description that the apparatus functions in the following manner when the following preliminary adjustments are made.

(1) The transmitter drums 1 and 1' and the helix 29 are in phase, that is to say the message clips 34 and 34' on drums 1 and 1' and the start of helix 29 are all in the same relative angular positions.

(2) The scanning head 3 is set a distance of one scanning pitch in advance of scanning head 3' in the scanning direction.

(3) The commutator 8 is set so that the slot 11 is in the same angular relationship as the message clip 34 on drum 1.

When, with the apparatus in operation, scanning head 3 appears over the commencement of scanning line (a) the brush 15 will rest on segment 10 of commutator 9 and relay 20 will be energised with a polarity which causes 22 and 25 to close thus sending a signal from transmitter A to line, and a scanning line (a) will be reproduced at the receiver as shown in the figure. When drums 1 and 1' have completed one revolution scanning head 3 will be at the commencement of scannig line (b) and scanning head 3' will be at the commencement of scanning line (a'). Furthermore, commutator 8 will have rotated through 180° thereby causing a reversal of current in relay 20 which causes contacts 22 and 25 to break and contacts 25 and 24 to make. Scanning head 3' is now connected to line and the receiver records scanning line (a'). Scanning head 3 being disconnected from the line, no recording of scanning line (b) takes place and this is indicated in the figure by a broken line. It should also be noted that because helix 29 rotates at half the speed of drums 1 and 1' a complete line scan at the transmitter is reproduced as one half of a line scan at the receiver. Thus the material on drums 1 and 1' is reproduced half size and with alternate scanning lines only recorded. It will also be apparent that commutation takes place while the optical scanning heads 3 and 3' are over the message clips 34 and 34' which are dead sections where no recording takes place.

In the practical application of the invention thus set forth, various devices may be embodied in substitution for those which are herein shown as illustrating the principles involved; and variations may be made in various respects without departing from the scope of the invention. For example, the invention may also be applied to facsimile systems of the "flat bed" scanning kind employing linear scanning means both at the transmitter and the receiver. Furthermore, the invention is not limited to two transmitters co-operating with a receiver; for example, three transmitters may be made to co-operate with the receiver provided that their drum speeds are identical and three times the speed of the receiver helix. In this case reproductions of the three originals will be reproduced at one third the original size and with one-in-three of the scanning lines recorded. This procedure may be continued to the practical limit.

I claim:

1. A facsimile transmission system comprising means for simultaneously scanning a pair of images, means for successively transmitting alternate scanning lines from the respective scanning means and means for recording the transmitted scanning lines from the respective scanning means side by side.

2. A facsimile transmission system comprising means for simultaneously scanning a plurality of images, means for transmitting scanned lines from each of the respective images in turn and means for separately recording the scanned lines from the respective images.

3. A facsimile transmission system comprising a plurality of similar facsimile transmitters, means for successively transmitting scanned lines from each of the transmitters in turn and means for recording as single scanned lines each set of successive scanning lines from the respective transmitters.

4. A facsimile transmission system comprising two similar rotatable helix facsimile transmitters, means for successively transmitting scanned lines from each of the transmitters in turn and a rotatable helix facsimile receiver for recording the transmitted scanned lines and operating at one half of the speed of the transmitters.

5. A facsimile transmission system comprising a number of similar rotatable helix facsimile transmitters, means for successively transmitting scanned lines from each of the transmitters in turn and a rotatable helix facsimile receiver for recording the transmitted scanned lines and operating at a speed corresponding to the speed of the transmitters divided by the number of transmitters.

References Cited by the Examiner
Radio Electronics, June 1949, page 21.

DAVID G. REDINBAUGH, Primary Examiner.
HOWARD W. BRITTON, Assistant Examiner.